Patented Aug. 14, 1934

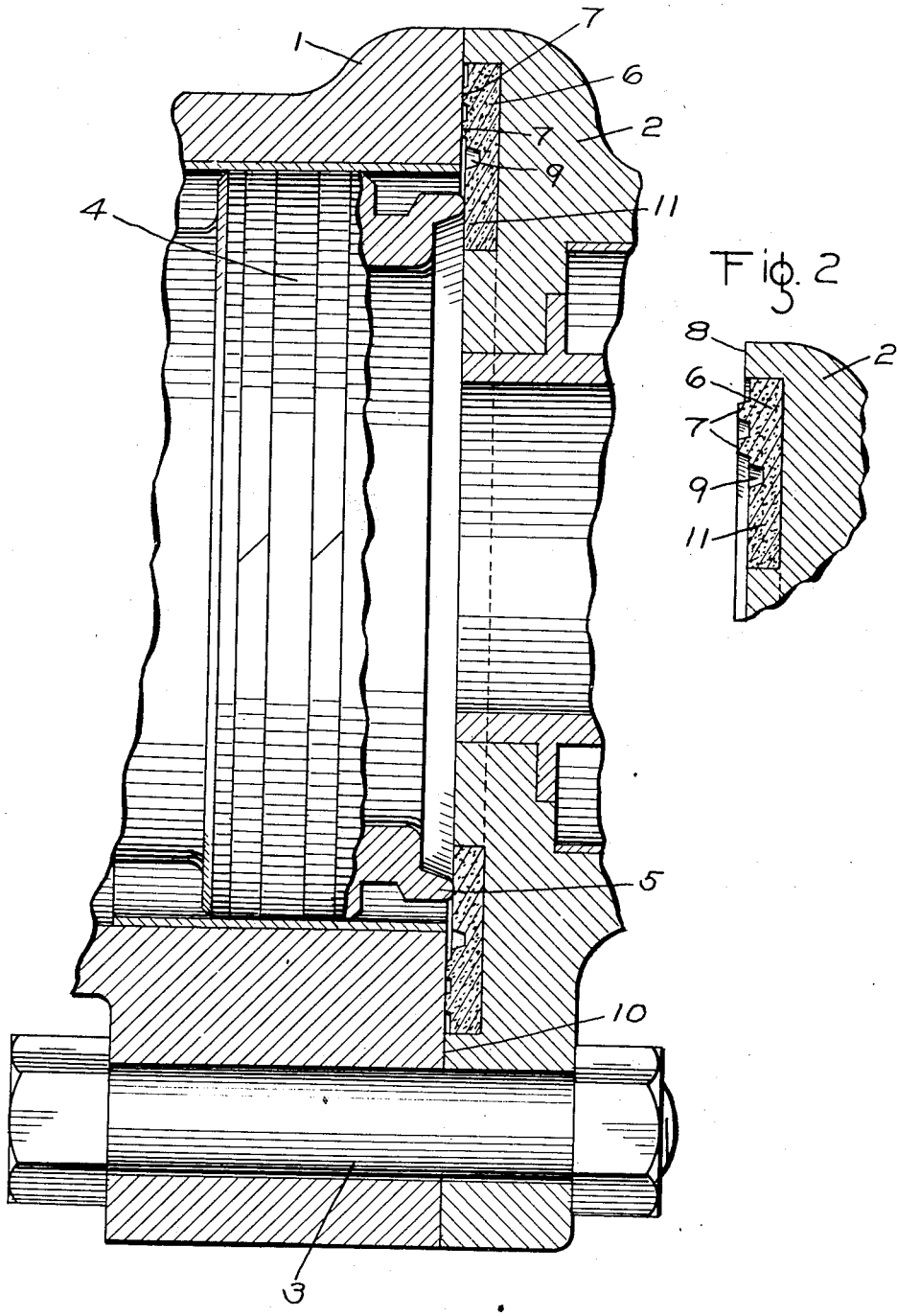

1,969,795

UNITED STATES PATENT OFFICE 1,969,795

GASKET

Ellis E. Hewitt, Edgewood, Pa., assignor to The Westinghouse Air Brake Company, Wilmerding, Pa., a corporation of Pennsylvania Application July 26, 1933, Serial No. 682,239

1 Claim. (Cl. 288—1)

This invention relates to gaskets, and more particularly to a gasket which serves to prevent leakage at the joint between a casing and a cover plate and also provides a seal for a piston to prevent leakage of fluid under pressure from the chamber at one side of the piston to the chamber at the opposite side of the piston.

With the usual gasket of the above type, the gasket tends to buckle or deform, when the gasket is compressed by the clamping of the cover plate to the casing and as a consequence, a piston adapted to seal on the gasket requires a relatively high differential fluid pressure in order to press the piston against the gasket with sufficient force to ensure that a leak tight seal will be provided to prevent leakage of fluid under pressure from the chamber at one side of the piston to the chamber at the opposite side.

If the gasket were not buckled or deformed as above described, and a flat sealing face were provided, then only a light differential pressure would be necessary to ensure a tight seal between the piston and the gasket.

The principal object of my invention is to provide a gasket construction which will not buckle or deform when clamped between two members, so that a flat smooth sealing face will be provided.

In the accompanying drawing; Fig. 1 is a sectional view of a structure, showing my improved gasket associated therewith; and Fig. 2 a fragmentary section of the cover plate shown in Fig. 1, showing the gasket when not compressed by the clamping of the cover plate to the casing.

In order to illustrate one application of my improved gasket there is shown in Fig. 1 a portion 1 of a casing to which a cover plate 2 is adapted to be clamped by means of bolts 3. The casing 1 is provided with a cylindrical bore in which is mounted a piston 4, which may be provided with an annular sealing rib 5.

The cover plate 2 is provided with an annular recess in which is mounted my improved gasket 6. In the present instance, the gasket is in the form of an annular ring of rubber or other resilient material and is provided with a pair of annular ribs 7 adapted to engage the sealing face of the casing 1. The ribs 7 extend beyond the engaging face 8 of the cover plate, when the gasket is not under compression, as shown in Fig. 2.

According to my invention, the gasket is provided with an annular groove or trench 9, which is preferably positioned adjacent to the ribs 7. When the cover plate 2 is clamped to the casing 1 by screwing down the clamping bolts 3, the ribs 7 are compressed and in the final position, the face 8 of the cover plate 2 engages the face 10 of the casing. Any deformation due to the compression of the ribs is taken up by expansion of the rubber into the groove 9, so that the portion 11 of the gasket is not deformed or buckled and remains flat and smooth.

As a result, only a slight differential fluid pressure, acting on the piston 4 in the chamber at the left of the piston, will be sufficient to ensure that the rib 5 will engage the gasket face 11 at all points throughout the circumference of the gasket and thereby ensure a leak tight seal between the rib 5 and the gasket.

The amount of compression of the gasket is always the same, since the compression is limited by the engagement of the face 8 of the cover plate 2 with the face 10 of the casing, so that the groove 9 can be accurately proportioned to ensure that deformation of the portion of the gasket subjected to pressure when the parts are clamped together will be provided for by expansion of the material of the gasket into the groove 9, without distorting the portion of the gasket which provides the engaging face for the rib 5 of the piston 4.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

A flexible gasket comprising a clamped portion adapted to be deformed when the gasket is clamped in place, a service portion extending beyond said clamped portion, and a groove disposed between said portions to prevent distortion of the service portion by taking up the deformation of the clamped portion.

ELLIS E. HEWITT.